Jan. 7, 1964  K. M. GORDON  3,116,628
HIGH-SPEED BEARING TORQUE TESTER
Filed July 12, 1960  2 Sheets-Sheet 1

INVENTOR
Keith M. Gordon
BY
ATTORNEYS

Jan. 7, 1964    K. M. GORDON    3,116,628
HIGH-SPEED BEARING TORQUE TESTER
Filed July 12, 1960

INVENTOR
Keith M. Gordon
BY
ATTORNEYS

United States Patent Office 3,116,623
Patented Jan. 7, 1964

3,116,623
HIGH-SPEED BEARING TORQUE TESTER
Keith M. Gordon, Westmoreland, N.H., assignor to Miniature Precision Bearings, Inc., Keene, N.H., a corporation of New Hampshire
Filed July 12, 1960, Ser. No. 42,301
6 Claims. (Cl. 73—9)

This invention relates to apparatus for measuring the running torque of bearings and more particularly to improved test apparatus for rapidly and accurately measuring the average running torque of an axially loaded ball-bearing assembly rotating at relatively high speeds.

In the manufacture of precision ball-bearings and in many operational applications of such bearings, precise knowledge of the bearing high speed torque characteristic is often of great importance. The increasingly severe requirements for performance accuracy in inertial guidance systems, in various gyroscopic instruments, and in many automatic control systems have imposed correspondingly severe requirements for accuracy and minimum frictional torque in the ball bearings used in such apparatus.

It is one of the objects of the present invention to provide an improved bearing torque tester which will rapidly and accurately measure the average running-torque characteristic of an axially loaded ball-bering assembly over a wide range of rotational speeds.

In accordance with the general teachings of the invention the ball-bearing to be tested is supported on a fixed position vertical spindle which is adapted to mate with the bearing inner race and hold that race in a static position. The outer bearing race is axially loaded by a cylindrical rotor cap and driven to the required high rotational speed about a substantially vertical axis by one or more gas jets acting on an embossed surface of the rotor. In accordance with a featured aspect of the invention, the rotor is maintained in desired dynamic alignment with the bearing support spindle at high rotational speeds by a gas bearing disposed around the outer periphery of the jet driven rotor cap. The gas bearing contributes a negligible amount of frictional torque to the rotating axially loaded bearing and at the same time substantially eliminates undesired vibrational effects which would otherwise be produced at high rotational speeds by slight mechanical unbalances in the rotor cap with respect to the axis of rotation. Rotation of the rotor cap is effected by the gas jets without introducing additional undesired vibrations.

Average running-torque as a function of rotational speed is measured with the apparatus of the invention by periodically measuring the rotational speed of the rotor cap during the free-running spin-down time of the axially loaded bearing.

In a preferred embodiment of the invention a plurality of equally spaced slots are provided in the lower extremity of the rotor cap and a light reflecting mirror mounted on the spindle support is adapted to reflect light rays chopped by the rotor. A photo-sensitive detector is provided to produce electrical output pulses in response to the chopped light rays reflected from an externally mounted light source. The output pulses are amplified and counted periodically by a pulse time interval counter to afford a periodic measurement of bearing rotational speed. Since the total rotor and bearing inertia is known and the main decelerating force is the running-torque of the bearing, a complete speed vs. average torque characteristic is obtained for a test bearing assembly in a single test run by measuring the rotational speed at periodic time intervals and correlating the spin-down time of the known inertia to average running-torque.

The invention can be best understood by referring to the drawings which show a preferred embodiment thereof. In the drawings.

Figure 1:
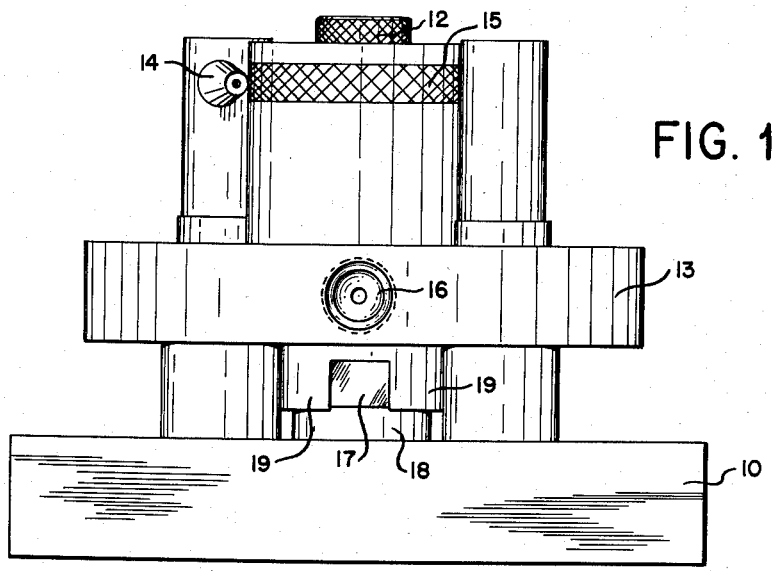
FIG. 1 is a side-elevation view of the high speed bearing torque tester provided by the invention.
Figure 3:
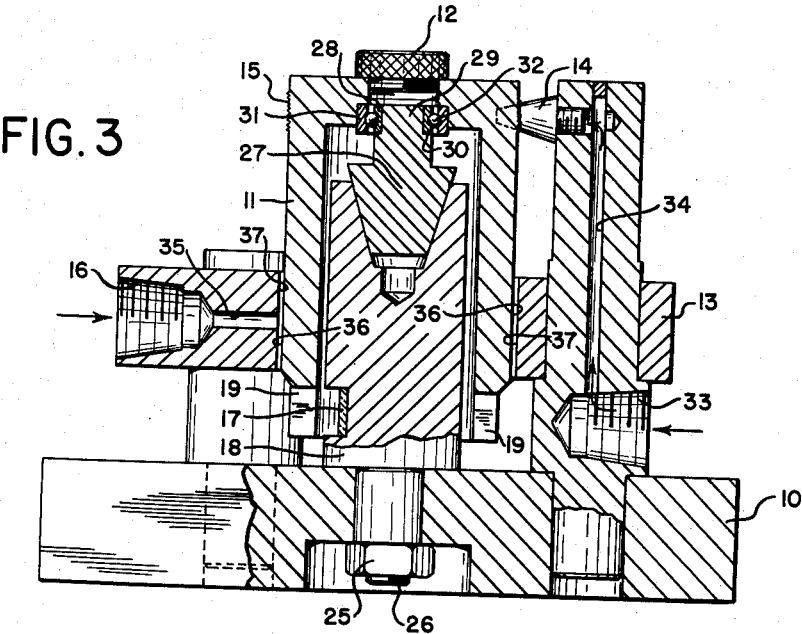
FIG. 3 is a sectional view of the bearing torque tester taken along line 3—3 as shown in FIG. 2.

Referring to FIG. 1, the torque test instrument includes a support base 10, a cylindrical rotor cap 11 with knurled handle 12 for lifting the rotor into and away from the operating position, and cylindrical member 13 which defines the outer wall surfaces for a gas bearing and the supply orifices therefor. A pair of jets 14 (one shown) are provided to direct high velocity jets of gas against the embossed surface 15 of rotor 11 and thereby drive the rotor at the required high rotational speeds. Pressurized gas is supplied to the orifices for the gas bearing via input hose coupler 16. Mirror 17, secured to the lower part of spindle base 18, functions to reflect light rays from an external light source back to a photo-cell detector. The light rays are periodically chopped by slot segments 19 on the lower portion of the rotor cylinder. As shown in FIG. 3, spindle base 18 is fixedly secured to base 10 by nut 25 and threaded portion 26. A self-centering removable conical spindle member 27 is provided to support the bearing to be tested. The inner race 28 of the test bearing is snugly mounted over the reduced cylindrical spindle section 29 and supported on the shoulder surface 30 as shown. Rotor 11 is provided with a counterbored hole in the top inside surface, the hole being sufficiently large to snugly mate with the outer race 31 of the test bearing. The rotor thus supported on the outer race of the bearing is free to rotate about a substantially vertical axis of rotation on ball elements 32 of the bearing. Interchangeable rotor caps and conical spindle members are advantageously provided to accommodate bearings with different race sizes.

The rotor cap is supported at the top on the outer race of the bearing under test and driven to the high rotational speed (e.g., 40,000 r.p.m.) by the high velocity jets of gas supplied from a compressed supply of gas through hose connector 33, supply duct 34, and jet orifice 14. External valve means (not shown) are provided for energizing and deenergizing the rotor driving jets independently of the gas bearing orifices.

Figure 2:
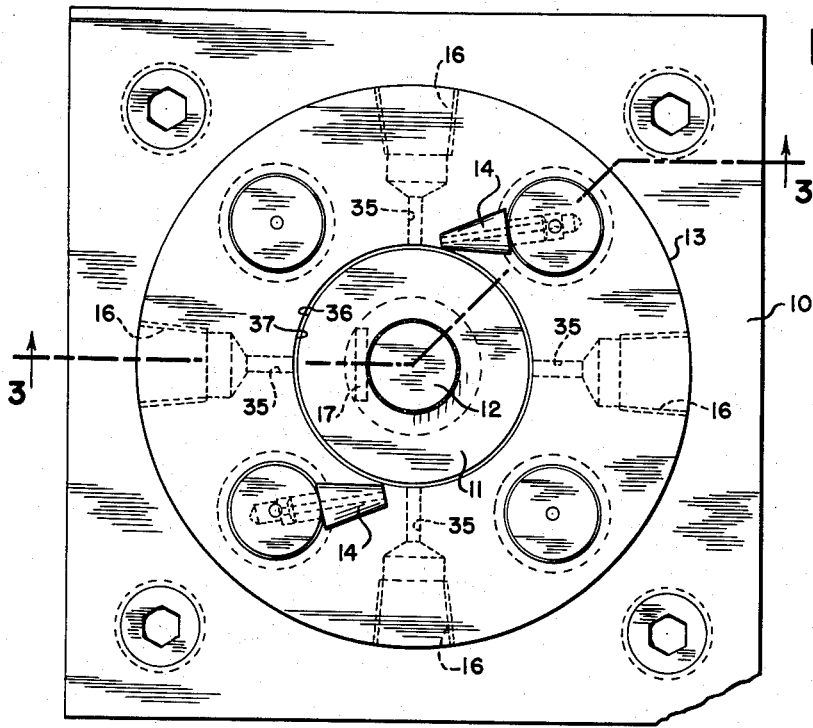
FIG. 2 is a top plan view of the embodiment shown in FIG. 1.

The rotor is guided radially at the lower extremity by a gas bearing to preclude rotor wobble at high rotational speeds. The desired stable dynamic alignment of the rotor is afforded by the flow of compressed gas through orifice 35. Four supply orifices are provided as shown in FIG. 2 in order to afford a uniform flow distribution of compressed gas through the annular space defined by the outer wall surface 36 of the rotor and the inner wall surface 37 of cylinder 13. The continuous flow of compressed gas through the small clearance space provides the necessary support and dynamic stabilization of the rotor for high speed testing operations, and at the same time contributes a vanishly small amount of frictional drag on the rotor. The small amount of frictional torque that is contributed by the gas bearing, can readily be computed from the following equation by treating the cylindrical rotor as a concentric-cylinder viscosimeter:

$$M = \frac{2r^3 L W \mu}{h} \qquad (1)$$

where:

$M$ = moment (inch, pounds)
$\mu$ = viscosity (reyns) ($2.6 \times 10^{-9}$ for air)

$h$=clearance (inches)
$r$=mean radius (inches)
$L$=length (inches)
$W$=speed (radians per second)

It will be noted that for a given configuration the torque contributed by the air bearing varies linearly as a function of rotational speed. In most practical test instruments the amount of torque contributed by the gas bearing and by air drag on the rotor is negligibly small compared to the bearing torque and may be neglected.

Figure 4:
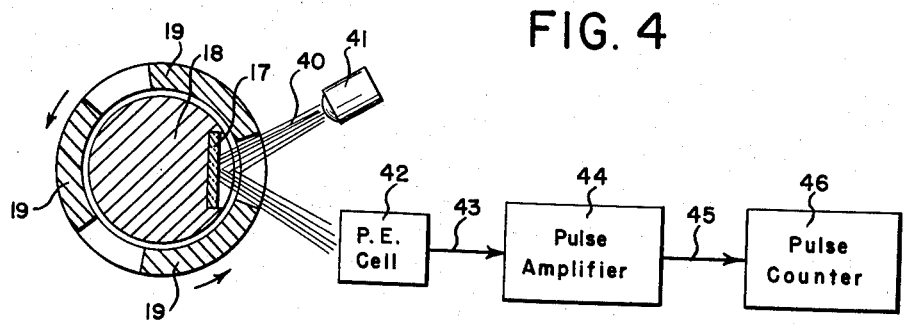
FIG. 4 is a block diagram showing photo-electric type speed measuring apparatus provided as a part of the invention.

Referring to FIG. 4, there is shown therein a preferred embodiment of the speed measuring apparatus provided as a part of the present invention. Light rays 40 radiated from external light source 41 are reflected by mirror 17 and caused to impinge on the sensitive surface of photoelectric cell 42. As described above, the light rays are periodically chopped by segments 19 on the lower extremity of the rotor cap. Three slots are provided as shown and the light rays impinging on the surface of the photo-electric cell are consequently interrupted three times for each revolution of the rotor 11. Additional slots may be provided to afford improved measuring accuracy at lower operating speeds. Electrical output pulses (three per rotor revolution) produced by photo-electric cell 42 in response to the chopped light rays are supplied by conductor 43 to pulse amplifier 44 through conductor 45 to pulse counter 46. Pulse counter 46 is a conventional time-interval counter which counts the number of pulses supplied to the input from the photo-electric cell for a desired time interval (e.g., one second) and displays the count number for a required readout time interval (e.g., one second). The average speed of rotation $W_{1-2}$ over a time interval covered by consecutive pulse counts $C_1$ and $C_2$ is readily computed from the following equation:

$$\overline{W}_{1-2} = \frac{\frac{C_1}{N} + \frac{C_2}{N}}{T_c + T_d} \text{ r.p.s.} \quad (2)$$

where:

$C_1$ and $C_2$ are two consecutive pulse counts
$N$=number of rotor slots (3)
$T_c$=count time (one second)
$T_d$=display time (one second)

The above equation may be reduced to the following:

$$W_{1-2} = 10(C_1 + C_2) \text{ r.p.m.} \quad (3)$$

The average frictional running torque of the bearing which is primarily responsible for deceleration of the loaded outer race of the test bearing can easily be computed by use of the following torque equation:

$$T_{1-2} = I\alpha \quad (4)$$

where:

$I$=rotor moment of inertia (gm. cm.²)
$\alpha$=deceleration over the time period covered by successive counts $C_1$ and $C_2$.

Deceleration may be computed by using the following equation:

$$\alpha = \frac{dw}{dt}$$

$$= \frac{\frac{C_1}{N} - \frac{C_2}{N}}{T_c + T_d} \text{ rev./sec.}^2 \quad (5)$$

Average torque $T_{1-2}$ measured by the two successive counts may be expressed as follows:

$$T_{1-2} = I\left(\frac{\frac{1}{N}(C_1 - C_2)}{T_c + T_d}\right) \text{ gm. cm.} \quad (6)$$

It should be noted that both the torque formula and the speed formula comprise simple additions or subtractions combined with multiplications and that the entire average torque vs. rotational speed characteristic of a given test bearing may be readily plotted from the speed measurements obtained during one spin-down interval of a test bearing. In practice, the test bearing is driven to a speed somewhat above the desired maximum, the compressed gas (e.g., air) supply to the driving jets is turned off and the periodic pulse counts are started and continued throughout the free-running spin-down interval from a maximum speed down to a predetermined minimum speed. The periodically recorded pulse count data can readily be reduced to torque and speed values using a simple desk calculator.

While a single preferred embodiment of the invention has been described and shown in the drawings, it will be appreciated by those skilled in the art that various changes and modifications may be made within the scope of the invention as defined in the appended claims.

I claim:

1. Apparatus for measuring the average running torque of an axially loaded ball-bearing assembly as a function of rotational speed of the outer-race with respect to the inner-race thereof, comprising means for supporting said bearing assembly including a vertical spindle having a cylindrical portion provided to mate with the bearing inner-race and support the said inner-race in a fixed position with respect to the outer-race, the said outer-race being freely rotatable about a substantially vertical axis, means for axially loading the said outer-race with respect to the said inner-race, said means comprising a cylindrical shaped rotor-cap which is adapted to mate with the outer-race of said bearing assembly and be rotatably supported thereby, means for rotating said rotor-cap at a high velocity about a substantially vertical axis, support means for maintaining said rotor-cap in dynamic alignment with respect to the axis of rotation therefor, said means including a gas bearing disposed about a portion of the cylindrical wall surface of said rotor-cap, and means for periodically measuring the free running rotational speed of said rotor throughout the spin-down time interval between predetermined maximum and minimum rotational speeds.

2. Apparatus for measuring the average running torque of an axially loaded ball-bearing assembly as a function of rotational speed of the outer-race with respect to the inner-race thereof, comprising means for supporting said bearing assembly including a vertical spindle having a cylindrical portion provided to mate with the bearing inner-race and support the said inner-race in a fixed position with respect to the outer-race, the said outer-race being freely rotatable about a substantially vertical axis, means for axially loading the said outer-race with respect to the said inner-race, said means comprising a cylindrical shaped rotor-cap which is adapted to mate with the outer-race of said bearing assembly and be rotatably supported thereby, means for rotating said rotor-cap at a high veloctiy about a substantially vertical axis, said means includnig a gas jet arranged and positioned to direct a high velocity stream of gas against the surface of said rotor, support means for maintaining said rotor-cap in dynamic alignment with respect to the axis of rotation therefor, said means including a gas bearing disposed about a portion of the exterior wall surface of the said cylindrical rotor-cap, and means for periodically measuring the free running rotational speed of said rotor throughout the spin-down time interval between predetermined maximum and minimum rotational speeds.

3. Apparatus for measuring the average running torque of an axially loaded ball-bearing assembly as a function of rotational speed of the outer-race with respect to the inner-race thereof, comprising means for supporting said bearing assembly including a vertical spindle having a cylindrical portion provided to mate with the bearing inner-race and support the said inner-race in a fixed position with respect to the outer-race, the said outer-race being freely rotatable about a substantially vertical axis, means for axially loading the said outer-race with respect to the said inner-race, said means comprising a cylindrical shaped rotor-cap which is adapted to mate with the outer-race of said bearing assembly and be rotatably supported thereby, means for rotating said rotor-cap at a high velocity about a substantially vertical axis, said means including a plurality of gas jets adapted to be energized by a supply of compressed gas, the said jets being positioned so as to direct a high velocity stream of gas against an embossed surface on the wall of said rotor, support means for maintaining said rotor-cap in dynamic alignment with respect to the axis of rotation therefor, said means including a gas bearing disposed about a portion of the exterior wall surface of the said cylindrical rotor-cap, and means for periodically measuring the free running rotational speed of said rotor throughout the spin-down time interval between predetermined maximum and minimum rotational speeds.

4. Apparatus for measuring the average running torque of an axially loaded ball-bearing assembly as a function of rotational speed of the outer-race with respect to the inner-race thereof, comprising means for supporting said bearing assembly including a vertical spindle having a cylindrical portion provided to mate with the bearing inner-race and support the said inner-race in a fixed position with respect to the outer-race, the said outer-race being freely rotatable about a substantially vertical axis, means for axially loading the said outer-race with respect to the said inner-race, said means comprising a cylindrical shaped rotor-cap which is adapted to mate with the outer-race of said bearing assembly and be rotatably supported thereby, means for rotating said rotor-cap at a high velocity about a substantially vertical axis, said means including a gas jet arranged and positioned to direct a high velocity stream of gas against the surface of said rotor, support means for maintaining the said rotor-cap in dynamic alignment with respect to the axis of rotation therefor, said means including a fixed position housing having a cylindrical bearing wall surface with a plurality of gas orifices communicating between external compressed gas connectors and the internal bearing wall surface, the said cylindrical wall surface being so positioned as to surround a portion of said cylindrical rotor surface to define a gas bearing clearance, and means for periodically measuring the free running rotational speed of said rotor throughout the spin-down time interval between predetermined maximum and minimum rotational speeds.

5. Apparatus for measuring the average running torque of an axially loaded ball-bearing assembly as a function of rotational speed of the outer-race with respect to the inner-race thereof, comprising means for supporting said bearing assembly including a vertical spindle having a cylindrical portion provided to mate with the bearing inner-race and support the said inner-race in a fixed position with respect to the outer-race, the said outer-race being freely rotatable about a substantially vertical axis, means for axially loading the said outer-race with respect to the said inner-race, said means comprising a cylindrical shaped rotor-cap which is adapted to mate with the outer-race of said bearing assembly and be rotatably supported thereby, means for rotating said rotor-cap at a high velocity about a substantially vertical axis, said means including a plurality of gas jets adapted to be energized by a supply of compressed gas, the said jets being positioned so as to direct a high velocity stream of gas against an embossed surface on the wall of said rotor, support means for maintaining said rotor-cap in dynamic alignment with respect to the axis of rotation therefor, said means including a gas bearing disposed about a portion of the exterior wall surface of the said cylindrical rotor-cap, and means for periodically measuring the free running rotational speed of said rotor throughout the spin-down time interval between predetermined maximum and minimum rotational speeds, said means including an electromechanical transducer provided to produce electrical output pulses proportional in frequency to the rotational speed of said rotor, and a time-interval pulse counter provided to periodically count and display the number of output pulses produced by said transducer during a predetermined time interval.

6. Apparatus for measuring the average running torque of an axially loaded ball-bearing assembly as a function of rotational speed of the outer-race with respect to the inner-race thereof, comprising means for supporting said bearing assembly including a vertical spindle having a cylindrical portion provided to mate with the bearing inner-race and support the said inner-race in a fixed position with respect to the outer-race, the said outer-race being freely rotatable about a substantially vertical axis, means for axially loading the said outer-race with respect to the said inner-race, said means comprising a hollow cylindrical shaped rotor-cap having a closed top and an open bottom end, the bottom end of said rotor-cap having a plurality of uniformly spaced slots communicating between the inner and outer wall surfaces thereof, the inner surface of said top end being adapted to mate with the outer-race of said bearing assembly, means for rotating said rotor-cap at a high velocity about a substantially vertical axis, said means including a gas jet arranged and positioned to direct a high velocity stream of gas against the surface of said rotor, support means for maintaining said rotor-cap in dynamic alignment with respect to the axis of rotation therefor, said means including a gas bearing disposed about a portion of the cylindrical wall surface of said rotor-cap, a light source mounted adjacent said rotor near the slotted end thereof, mirror means mounted on said spindle positioned to reflect light rays from said light source as chopped by the rotating slotted end of said rotor, photo-sensitive detector means provided to detect the chopped rays of light and produce electrical output pulses proportional in frequency to the rotational speed of the said rotor-cap, and a time-interval pulse counter provided to periodically count and display the number of output pulses produced by the said photo-sensitive detector during a predetermined time interval.

References Cited in the file of this patent

UNITED STATES PATENTS

| Re. 20,305 | Klahn | Mar. 23, 1937 |
| 1,337,742 | Abbott | Apr. 20, 1920 |
| 2,353,150 | Dietz | July 11, 1944 |
| 2,427,364 | McKendry | Sept. 16, 1947 |
| 2,663,977 | Gerard et al. | Dec. 29, 1953 |
| 2,756,115 | Michel | July 24, 1956 |
| 2,867,114 | Mims | Jan. 6, 1959 |
| 2,937,518 | Bjong et al. | May 24, 1960 |
| 3,023,604 | Gordon et al. | Mar. 6, 1962 |